United States Patent [19]
Farrell

[11] Patent Number: 5,368,528
[45] Date of Patent: Nov. 29, 1994

[54] BEARING THRUST ASSEMBLY FOR PLANET GEARS IN PLANETARY GEAR CARRIER ASSEMBLIES

[75] Inventor: Michael J. Farrell, Brownsburg, Ind.
[73] Assignee: General Motors Corporation, Detroit, Mich.
[21] Appl. No.: 41,114
[22] Filed: Apr. 1, 1993
[51] Int. Cl.⁵ .............................................. F16H 3/44
[52] U.S. Cl. ............................. 475/348; 475/159; 475/253; 384/564; 384/569; 384/424
[58] Field of Search ............... 475/159, 160, 253, 348; 384/127, 564, 569, 424

[56] References Cited
U.S. PATENT DOCUMENTS

| | | | |
|---|---|---|---|
| Re. 26,578 | 5/1969 | Naumann | 475/348 |
| 3,943,780 | 3/1976 | Klaue | 475/348 |
| 4,480,492 | 11/1984 | Fujioka et al. | 74/467 |
| 4,756,212 | 7/1988 | Fuehrer | 475/348 |
| 4,776,237 | 10/1988 | Premiski et al. | 74/750 R |
| 5,188,576 | 2/1993 | Maguire et al. | 475/348 |

*Primary Examiner*—Leslie A. Braun
*Assistant Examiner*—Daniel Wittels
*Attorney, Agent, or Firm*—Donald F. Scherer

[57] ABSTRACT

A planet gear is rotatably supported in a planet carrier assembly on needle bearings. A first, gear thrust washer bearing member permits relative rotation between the planet gear and the carrier assembly while transmitting thrust forces between the planet gear to the carrier. The thrust forces generated by the needle bearings are transmitted to the first, gear thrust washer bearing member through a second, needle, thrust washer bearing member which is disposed in a recess within the face of the planet gear and freely rotatable relative to the planet gear.

10 Claims, 2 Drawing Sheets

5,368,528

BEARING THRUST ASSEMBLY FOR PLANET GEARS IN PLANETARY GEAR CARRIER ASSEMBLIES

TECHNICAL FIELD

The present invention relates generally to thrust bearing assemblies. More particularly, the present invention relates to thrust bearing arrangements adapted for mounting planet gears on planetary carrier assemblies. Specifically, the present invention relates to thrust bearings utilized in carrier assemblies of planetary gear sets for separately transmitting the thrust forces generated by the planet gears and the needle bearings by which the planet gears are rotatably mounted in carrier assemblies.

BACKGROUND OF THE INVENTION

Planetary gear sets have a sun gear, a ring or internal gear and a plurality of pinion, or planet, gears which mesh with the sun and ring gears. The planet gears are rotatably supported from a carrier. The planet gears are often subjected to thrust loads that are imposed by virtue of a slight difference in the angular disposition of the helical teeth on either the sun or ring gears or between the pinion gears and the sun and ring gears. Some thrust loads are imposed by the shafting arrangement in the transmission. For example, thrust loads can be imposed as a result of axial movement of the output shaft. Thrust loads are transmitted between the planet gears and the supporting carrier structure through thrust washer bearing means which permit relative rotation during transmission of the thrust loading.

The planet gears are generally mounted on bushings, or needle bearings. If needle bearings are present, thrust forces can be generated within the needle bearings, and those thrust forces must also be transmitted to the carrier by which the planet gears are supported. The needle bearings not only rotate on their longitudinal axis, they also planetate about the spindle upon which they are operatively mounted rotatably to support a planet gear. For that reason the angular velocity at which the needle bearings planetate is different from the rotational speed of the associated planet gear on the spindle. Thus, when a single thrust bearing is used, it must absorb the thrust forces while simultaneously being subjected to the relative speed differences between the gear, the needles and the carrier.

SUMMARY OF THE INVENTION

It is, therefore, a primary object of the present invention to provide an improved thrust bearing assembly for mounting planet gears on carrier assemblies in planetary gear sets.

It is another object of the present invention to provide an improved thrust bearing assembly, as above, wherein a needle thrust washer bearing is freely, and rotatably, supported relative to the planet gear for transmitting thrust between needle support bearings and the carrier.

It is a further object of the present invention to provide an improved thrust bearing assembly, as above, wherein a gear thrust washer bearing means is fixed to a planet carrier in order to transmit thrust forces between the planet gear and the carrier, and a second bearing means is rotatably supported in an axial recess in the planet gear to transmit thrust forces between support needles and the carrier independently of the gear thrust forces.

It is still another object of the present invention to provide an improved planetary gear, washer, spindle and bearing assembly.

It is yet another object of the present invention to provide an improved planetary carrier assembly, as above, having a hardened, needle thrust washer bearing member for transmitting needle thrust loads separate from any thrust loads imposed by the planet gear.

It is a still further object of the present invention to provide an improved planetary carrier assembly, as above, wherein the hardened, needle thrust washer bearing member is maintained out of contact with the spindle.

It is an even further object of the present invention to provide an improved planetary carrier assembly, as above, wherein a gear thrust washer bearing member is provided with structure providing improved oil film generation between the planet gear and the gear thrust washer bearing member.

These and other objects of the invention, as well as the advantages thereof over existing and prior art forms, which will be apparent in view of the following detailed specification, are accomplished by means hereinafter described and claimed.

In general, the present invention provides a dual thrust bearing arrangement wherein a first, or gear, thrust washer bearing member is fixed to the carrier assembly of a planetary gear set, and a second, or needle, thrust washer bearing member is freely supported by the planet gear. The first, or gear, thrust washer bearing member transmits thrust forces between the planet gear and the carrier assembly, and the second, or needle, thrust washer bearing member transmits thrust forces between the needle beating assembly, which rotatable supports the planet gear on the carrier assembly, and the carrier assembly. The second, or needle, thrust washer bearing members are disposed in a counterbore, or recess, on each side of each planet gear. Each recess has an outer diametral dimension which provides a pilot for the outer diameter of the second, or needle, thrust washer bearing member and a depth that is slightly greater than the thickness of the second, or needle, thrust washer bearing member. The inner diameter of the second thrust washer member is slightly smaller than the needle-circle diameter at which the needles are disposed on the spindle but greater than the outer diameter of the spindle. This permits the second, or needle, thrust washer member to rotate freely with respect to the planet gear when thrust forces are present between the needles and the second thrust washer member. Thus, the relative rotation between the needles and the carrier is accommodated by the second thrust washer member.

The present invention provides an improved planetary gear, washer, spindle, and bearing system operating at elevated conditions of speed and/or load. The improvements are achieved by virtue of separating the needle thrust washer bearing member from the gear thrust forced, thereby eliminating contact between the needle washer bearing member and the spindle, and enhancing oil film generation between the planet gear face and the customary gear thrust washer bearing member.

The gear thrust washer bearing member is piloted from its outer diameter into the recess in the face of the planet gear. There is always clearance between the inner diameter of the hardened needle thrust washer bearing member and the outer diameter of the spindle on which the planet gear is rotatably mounted, even at extremes of the limit stack conditions. This increases the contact area for piloting the hardened needle thrust washer bearing member, decreases the contact stress and eliminates the wear caused by conventional contact between the inner diameter of a thrust washer beating member and the outer diameter of the spindle.

The load on the hardened needle thrust washer bearing member is further reduced by nesting it within the recess in the gear face. Accordingly, when the planet gear is thrust against the gear thrust washer bearing member, an axial clearance remains for the needle thrust washer bearing member such that it is exempt from the planet gear thrust loads. This also serves to decrease the relative speed between the gear and needle thrust washers, thereby decreasing the amount of heat generated. This reduction in speed results because the hardened thrust washer bearing member is being driven at the needle beating planetating speed instead of the higher, angular velocity of the planet gear, as occurs with the conventional design approach of sandwiching the needle thrust washer between the gear thrust washer and the gear face.

The oil film between the planet gear and the gear thrust washer bearing member is enhanced as the operating clearance between the gear and needle washers permits a pooling of oil to improve oil availability for cooling and film generation between the gear thrust washers and faces of the planet gears. This film generation is further enhanced by a circular groove in the face of the gear thrust washer coincident with the diameter of the recess in the face of the planet gear.

The load between the gear thrust washer member and the needle bearings is not nearly as significant as the conventionally combined load of the gear and needle thrust washers. This load also occurs at a lower speed inasmuch as the hardened needle thrust washer member is being rotationally driven at the lower, planetating speed of the needle beatings instead of the higher, rotational speed of the planet gear, as has been the customary situation in prior art arrangements. Furthermore, this load is distributed across an increased area as the outer diameter of the needle thrust washer bearing member is increased beyond the outer needle-circle diameter of the needle bearings.

The combined result is less heat generation, improved heat dissipation, and less abrasion distress of the planetary system.

To acquaint persons skilled in the arts most closely related to the present invention, one preferred embodiment thereof that illustrates a best mode now contemplated for putting the invention into practice is described herein by, and with reference to, the annexed drawings that form a part of the specification. The exemplary thrust bearing assembly for planetary carrier assemblies is described in detail without attempting to show all of the various forms and modification in which the invention might be embodied. As such, the embodiment shown and described herein is illustrative, and as will become apparent to those skilled in these arts can be modified in numerous ways within the spirit and scope of the invention; the invention being measured by the appended claims and not by the details of the specification.

DESCRIPTION OF AN EXEMPLARY EMBODIMENT

Figure 1:
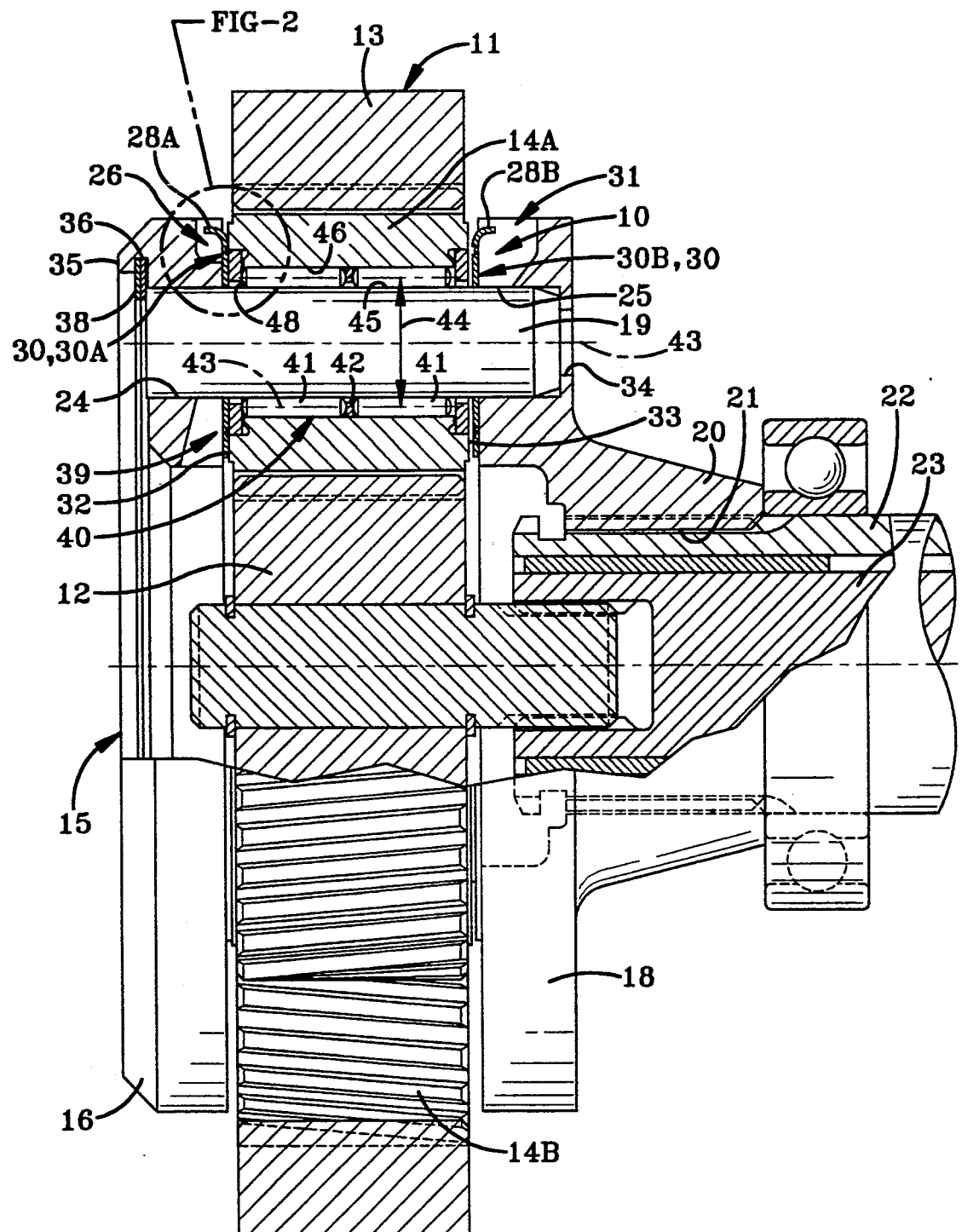
FIG. 1 is a side elevational view, partly broken away, of a planet carrier assembly incorporating the present invention; and, FIG. 2 is an enlarged view of that portion of FIG. 1 which is substantially identified by the circle designed with "FIG.-2" in FIG. 1.

One representative form of a thrust bearing assembly embodying the concepts of the present invention is designated generally by the numeral 10 on the accompanying drawings and is depicted in conjunction with a portion of a planetary gear set 11. The planetary gear set 11 has a sun gear 12, an outer, or ring, gear 13 and a plurality of planet gears 14 that are rotatably supported from a carrier assembly 15. The representative carrier assembly 15 includes a pair of spaced side walls 16 and 18 and a plurality of pins, or spindles, 19 upon which the planet gears 14 are rotatably supported. The first and second side walls 16 and 18, respectively, of the carrier 15 are secured together in a conventional manner, as by conventional spacers. Because of their widely employed usage, neither the conventional manner by which the side walls 16 and 18 are spaced apart, nor the spacers themselves are shown. The second side wall 18 has a hub 20 which has a splined, cylindrical interior surface 21 to permit attachment to a sleeve shaft 22. In that way, the sun gear 12 may be operatively connected to a shaft 23 which extends axially within the interior of the sleeve shaft 22 in a manner that is conventional to planetary transmissions.

A plurality of apertures 24, which penetrate the first side wall 16, provide support for one end of each spindles 19. The other end of each spindle 19 is supported in the plurality of apertures 25 that are provided in the second side wall 18.

The first side wall 16 has one or more radial slots 26 in which a tab 28A of a first, or gear, thrust washer bearing member 30A, that is traditionally made of bronze, is disposed. The second side wall 18 also has one or more radial slots 31 in which the tab 28B of another gear thrust washer bearing member 30B is disposed. The gear thrust washer bearing members 30 are conventional members well known in the art of planetary transmissions to be interposed between the planet gears 14 and the walls 16 and 18 of the carrier assembly 15. These gear thrust washer bearing members 30 are positioned to transmit thrust forces between the planet gears 14 and the side walls 16 and 18 of the carrier assembly 15. As is well known, the gear thrust washer bearing members 30 will serve to receive, and distribute, the axial forces extant between relatively rotating components. During operation of the transmission, the planet gears 14 will rotate on the spindles 19 while the side walls 16 and 18 of the carrier assembly 15 remains stationary relative to the spindles 19. Any unbalanced forces on the gears in the planetary gear set which have helical teeth (such as the sun gear 12 and the planet gear 14 depicted in FIG. 1), will urge one or more planet gears 14 into contact with the appropriately located first, or gear, thrust washer bearing members 30. Because the planet gears 14 typically have flat, and hardened, side faces 32 and 33, it has been found preferable to have the side faces 32 and 33 engage the first gear thrust washer bearing members 30 rather than to allow the side faces 32 and 33 to abut the respective side walls 16 and 18 of the carrier assembly 15. The use of bronze, thrust washer bearing members 30 also eliminates the need to provide a machine finish on the opposed, inner surfaces of each side wall 16 and 18 in the carrier assembly 15.

As previewed in the previous paragraph, and as will appear in the detailed description which follows, a particular structural member, component or arrangement may be employed at more than one location. When referring generally to that type of structural member, component or arrangement a common numerical designation shall be employed. However, when one of the structural members, components or arrangements so identified is to be individually identified it shall be referenced by virtue of a letter suffix employed in combination with the numerical designation employed for general identification of that structural member, component or arrangement. Thus, there are a plurality of first, or gear, thrust washer bearing members which are generally identified by the numeral 30, but the specific, individual gear thrust washer bearing members are, therefore, identified as 30A, 30B, etc. in the specification and on the drawings. This same suffix convention shall be employed throughout the specification.

The aperture 25 that penetrates the second side wall 18 presents a reduced diameter portion 34 at longitudinally outer end thereof which limits the axial movement of the spindle 19 in one direction (to the right, as shown in FIG. 1). The first side wall 16 has an annular lip 35 that presents a groove 36 which accommodates a conventional retaining ring 38 to limit the axial movement of the spindle 19 in the opposite direction (to the left, as viewed in FIG. 1). The reduced diameter portion 34 and the retaining ting 38 cooperate to position the spindles 19 in the respective apertures 24 and 25, as described above.

The first side wall 16 has a plurality of tapered, radial extending slots 39 formed therein to direct lubrication fluid to the planet gears 14. This structural arrangement is a well known feature that has been employed with success to direct sufficient lubrication to planet carrier assemblies. Each planet gear 14 is rotatably supported on one of the spindles 19 by double-row, needle bearing assemblies 40. Each needle bearing assembly 40 is comprised of two rows of needles 41, the two rows being separated by a spacer ring 42. The plurality of needles 41 each have a longitudinal axis 43 disposed on a circumference of a needle-circle having a diameter designated at 44. As depicted, the needle-circle is disposed centrally within the annular space between the outer, cylindrical surface 45 of the spindle 19 and the cylindrical inner surface 46 of the planet gear 14 mounted on that spindle 19.

Each needle 41 has an axial end 48 which abuts a second, or needle, thrust washer bearing member 50 that may preferably be made of hardened steel and which is disposed in an annular counterbore, or recess, 51 formed in each side wall 32 and 33 of the planet gears 14. Each of the second, needle, thrust washer bearing members 50 has an outer diametral surface 52, a diametral inner surface 53 and a thickness 54. The outer diametral surface 52 is piloted by the annular surface 55 which defines the radially outer circumference of the recess 51. The inner diametral surface 53 of the needle thrust washer bearing member 50 has a dimension less than the needle-circle diameter 44 to permit abutment by the ends 48 of each needle 41 with the needle thrust washer bearing member 50 in order to assure that the needle thrust washer bearing member 50 will be positioned to absorb the thrust forces imposed by the ends 48 of the needles 41. The dimension of the inner diametral surface 53 is greater than the outer diameter of the spindle 19 in order preclude contact therebetween.

The hardened, second, or needle, thrust washer bearing member 50 is radially positioned by the pilot locating engagement of the outer diametral surface 52 thereon with the annular surface 55 of the recess 51 such that the inner diametral surface 53 of the needle thrust washer bearing member 50 is radially spaced with respect to the outer surface 45 of each spindle 19. This clearance is thereby assured, even at the extreme dimensions permitted by production tolerances. By thus utilizing the recess 51, the contact area for the pilot action of the needle thrust washer bearing member 50 is increased, the contact stress is decreased and the wear generally resulting by contact between the needle thrust washer bearing member and the spindle 19 present in conventional assemblies is eliminated. Even though the second, or needle, thrust washer bearing member 50 is piloted with in the recess 51, the needle thrust washer bearing member 50 is freely rotatable relative to the planet gear 14 with which it is used.

The thickness 54 of the needle thrust washer bearing member 50 is less than the depth 56 of the recess 51 to a sufficient degree that when the needle thrust washer bearing member 50 abuts the axially inner surface 58 of the recess 51, the needle thrust washer bearing member 50 will not abut the adjacent first, or gear, thrust washer bearing member 30. Likewise, when the needle, thrust washer bearing member 50 is in contact with the gear thrust washer bearing member 30, there will be no contact with the axially inner surface 58 of the recess 51. Thus, as the thrust forces are transmitted by the needle thrust washer bearing member 50 to the gear thrust washer bearing member 30, the rotational speed of the planet gear 14 will not be imposed on the needle thrust washer bearing member 50. Because the planetating speed of the needles 41 along the needle-circle is less than the rotational speed of the planet gear 14, the angular velocity differential at which the needle thrust forces are transmitted is reduced. This results in less heat generation during the absorption of the thrust forces applied by each needle 41.

This structural arrangement reduces the load on the needle thrust washer bearing member 50 by nesting it within the recess 51. When the planet gear 14 is urged against the gear thrust washer bearing member 30, an axial clearance will be present between the gear thrust washer bearing member 30 and the needle thrust washer bearing member 50, thereby reducing the heat generation generally associated with conventional assemblies. Likewise, when the needles 41 drive the needle thrust washer bearing member 50 against the gear thrust washer bearing member 30, an axial clearance between the planet gear 14 and the needle thrust washer bearing member 50 will be present. The relative speed between the gear thrust washer bearing member 30 and the needle thrust washer bearing member 50 is reduced due to the fact that the needle thrust washer bearing member 50 is driven by the needles 41 rather than by the planet gear 14. This contributes to a reduction in the heat generated within the system as compared with the conventional design approach of sandwiching both thrust washer bearings between the planet gear and the side wall of the carrier assembly.

Figure 2:
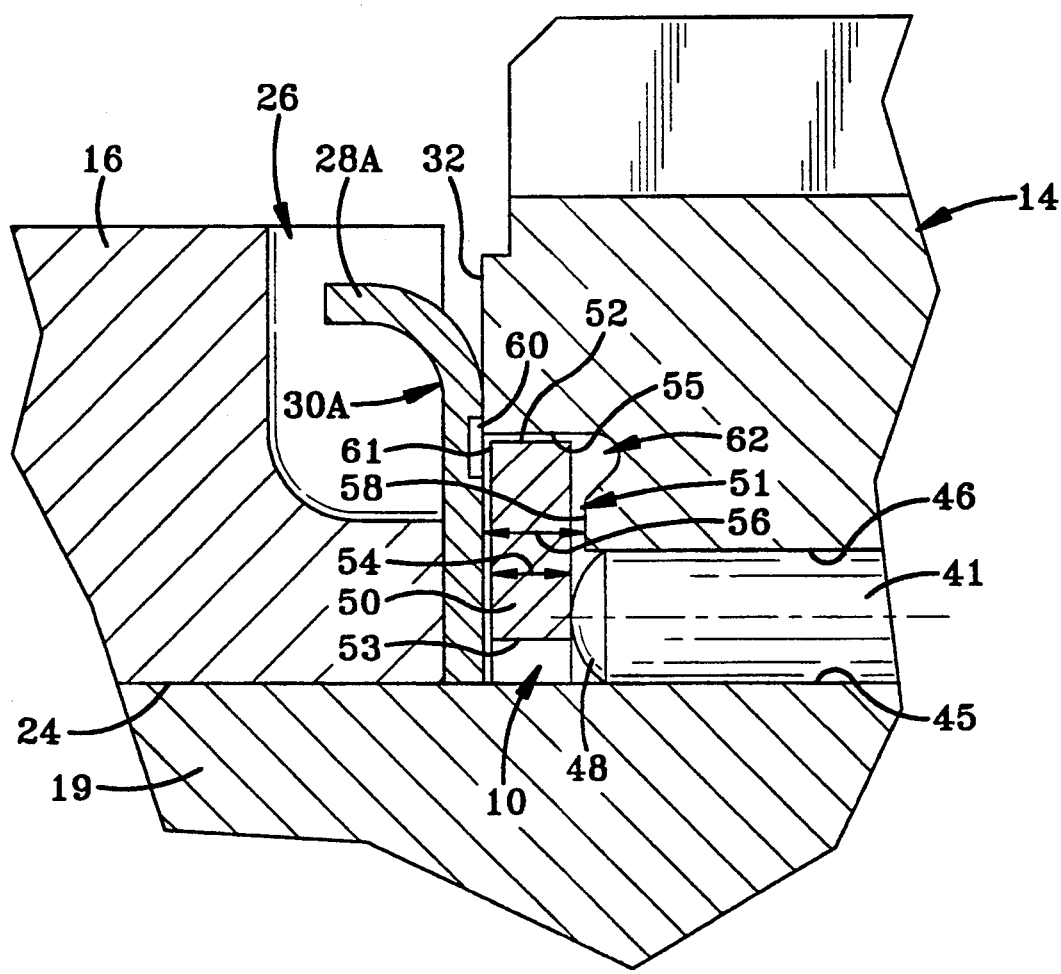

As best seen in FIG. 2, each of the gear thrust washer bearing members 30 has an annular groove 60 which is axially aligned to overlap the juncture, or interface, 61 between the needle thrust washer bearing member 50 and the recess 51. This groove 60 will maintain an oil film at the juncture 61, thereby improving the lubrication and heat dissipation in this area. This further improves the operating efficiency of the system and reduces the abrasion distress within the planet assembly.

The oil film between the planet gear 14 and the gear thrust washer bearing members 30 is enhanced as the operating clearance between the planet gear 14 and the needle thrust washer bearing member 50 permits a pooling of oil to improve lubricant availability for cooling and film generation between the gear thrust washer bearing members 30 and the planet gear 14. This film generation is further enhanced by the groove 60 in the gear thrust washer bearing members 30 coincident with the interface 61 between the recess 51 and the needle thrust washer bearing member 50.

The thrust load between the needle thrust washer bearing member 50 and the needles 41 is not as significant as the conventionally combined loads applied by the gear and needle bearing thrust forces. The thrust between the needle thrust washer bearing member 50 and needles 41 occurs at a lower speed inasmuch as the needle thrust washer bearing member 50 is driven at the planetating speed of the needle bearing assemblies 40. This load is distributed over an increased area as the outside diameter of needle thrust washer bearing member 50 is increased beyond the outer path of the needles. As a result of the present invention there is less heat generation, improved heat dissipation and less abrasion distress within the planet carrier assembly. While the gear and needle thrust washer beating members 30 and 50 are denoted as bronze and steel, respectively, these terms should not be considered as limiting. These materials are presently the best combination of materials for thrust bearings in planet carrier assemblies.

The foregoing description of the exemplary embodiment of the invention has been presented for the purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

As should now be apparent, the present invention not only teaches that a planetary thrust bearing for a carrier assembly embodying the concepts of the present invention produces an improved arrangement for transmitting thrust between needle support bearings and the carrier but also accomplishes the other objects of the invention.

I claim:

1. A thrust bearing assembly in combination with a planet gear mounted on a spindle supported between spaced walls of a carrier assembly in a planetary gear set, with a needle bearing assembly disposed between the spindle and the planetary gear, said thrust bearing assembly comprising:

first thrust washer bearing means interposed between and directly engaging a planet gear and at least one wall of the carrier;

second needle thrust washer bearing means interposed between the needle bearing assembly and the first thrust washer bearing means said needle thrust bearing means being adapted to abut the axial ends of needles forming said needle bearing assembly.

2. A thrust bearing assembly, as set forth in claim 1, wherein:

said second needle thrust washer bearing means has a thickness which precludes simultaneous engagement with the planet gear and either wall of the carrier assembly.

3. A thrust bearing assembly, as set forth in claim 2, wherein the planet gear has side faces, and the thrust bearing assembly further comprises:

an annular recess within each side face of the planet gear;

said second needle thrust washer bearing means being received within said recess.

4. A thrust bearing assembly, as set forth in claim 3, further comprising:

a peripheral wall presented by said recess;

said peripheral wall serving to pilot said second needle thrust washer bearing means into a desired radial position.

5. A thrust bearing assembly, as set forth in claim 4, wherein:

said second needle thrust washer bearing means has an inner diameter that is spaced radially outwardly of said spindle.

6. A thrust bearing assembly, as set forth in claim 5, further comprising:

a groove within said first thrust washer bearing means;

said groove extending annularly in opposition to a juncture of the peripheral wall of the recess and the second needle thrust washer bearing means.

7. A gear and thrust bearing assembly comprising:

a planet gear rotatably supported on a needle bearing assembly supported on a spindle secured in a planet carrier, said needle bearing assembly having a plurality of needle bearings, each having a longitudinal axis disposed on a needle-center diameter formed about the spindle, said planet gear having spaced side walls with each side wall having a recess with an outer surface of predetermined diameter and a depth of predetermined dimension;

gear thrust washer bearing means disposed between a gear side wall of the planet gear and being rotatably secured with the carrier, said gear thrust washer bearing means disposed adjacent the gear side wall for transmitting thrust forces between the side wall and the planet carrier, said gear thrust washer bearing means having an inner diameter with a dimension less than the needle-circle diameter; and, needle thrust washer bearing means having an outer diameter that cooperates with the predetermined diameter of the recess to pilot the needle thrust washer bearing means radially within the recess, a thickness less than the predetermined depth dimension of the recess, an inner diameter less than said needle-circle diameter;

said needle thrust washer bearing means being operable to transmit thrust forces from said needle thrust washer bearing means to said planet carrier and being free from thrust forces imposed by said planet gear.

8. A gear and thrust bearing assembly, as set forth in claim 7, wherein:
said spindle has an outer diametral surface of predetermined dimension less than the inner diameter of the needle thrust washer bearing means.

9. A gear and thrust bearing assembly, as set forth in claim 7, wherein:
said thrust bearing assembly having a lubrication groove axially aligned for communication with an outer diameter of the needle thrust washer bearing means and the outer surface of said recess.

10. A gear and thrust bearing assembly, as set forth in claim 8, wherein:
said gear thrust washer bearing means has an axially facing groove overlapping a radial interface between said needle thrust washer bearing means and said recess.

* * * * *